United States Patent
Russ et al.

(10) Patent No.: US 10,124,906 B2
(45) Date of Patent: Nov. 13, 2018

(54) SPLINED MUFF

(71) Applicant: Hamilton Sundstrand Corporation, Charlotte, NC (US)

(72) Inventors: David Everett Russ, Rockford, IL (US); David Norman Chapman, Rockford, IL (US); Scott J. Marks, Oregon, IL (US)

(73) Assignee: HAMILTON SUNDSTAND CORPORATION, Charlotte, NC (US)

( * ) Notice: Subject to any disclaimer, the term of this patent is extended or adjusted under 35 U.S.C. 154(b) by 339 days.

(21) Appl. No.: 14/877,497

(22) Filed: Oct. 7, 2015

(65) Prior Publication Data

US 2017/0101194 A1    Apr. 13, 2017

(51) Int. Cl.
| | | |
|---|---|---|
| *F01D 15/10* | (2006.01) | |
| *B64D 45/02* | (2006.01) | |
| *B64D 41/00* | (2006.01) | |
| *H02H 1/04* | (2006.01) | |
| *H02K 7/18* | (2006.01) | |

(52) U.S. Cl.
CPC ........... *B64D 45/02* (2013.01); *B64D 41/007* (2013.01); *F01D 15/10* (2013.01); *H02H 1/04* (2013.01); *H02K 7/1823* (2013.01); *F05D 2220/34* (2013.01); *F05D 2240/24* (2013.01)

(58) Field of Classification Search
CPC ....... B64D 45/02; B64D 41/007; F01D 15/10; H02H 1/04; H02K 7/1823; F05D 2220/34; F16D 3/06; F16D 2001/103
USPC .............................. 415/122.1; 244/58; 464/16
See application file for complete search history.

(56) References Cited

U.S. PATENT DOCUMENTS

| | | | |
|---|---|---|---|
| 5,660,591 A * | 8/1997 | Reynolds | F16D 3/74 |
| | | | 277/912 |
| 6,705,946 B2 * | 3/2004 | Bridges | F16D 1/02 |
| | | | 403/359.1 |
| 7,567,418 B2 | 7/2009 | Halsey | |
| 2013/0256454 A1 * | 10/2013 | Russ | F01D 15/08 |
| | | | 244/58 |

* cited by examiner

*Primary Examiner* — Igor Kershteyn
*Assistant Examiner* — Theodore Ribadeneyra
(74) *Attorney, Agent, or Firm* — Cantor Colburn LLP

(57) ABSTRACT

A splined muff is provided for use with a ram air turbine (RAT). The splined muff includes a body formed of plastic material that acts as an insulator during a lightning strike. The body is formed to define an aperture and includes an interior facing spline for engagement with a complementary exterior facing spline; and an exterior facing spline for engagement with a complementary interior facing spline.

17 Claims, 5 Drawing Sheets

SPLINED MUFF

BACKGROUND OF THE DISCLOSURE

The subject matter disclosed herein relates to lightning protection for aircraft and, more particularly, to a splined muff to provide for lightning protection for aircraft.

A ram air turbine (RAT) may be provided on an aircraft for multiple reasons. These include, but are not limited to, providing emergency power to the aircraft to enable a safe landing when normal power sources, such as the engines, are disabled. When operated, the RAT is deployed into an airstream proximate to an outer skin or wing of the aircraft. The airstream thus flows into the RAT and turns its rotor to generate electrical power.

Since it is often the case that the aircraft may fly near a thunderstorm during emergency events, lightning may strike the exposed RAT. Such lightning strikes can cause an electrical current to travel up the drivetrain of the RAT and is a well-known hazard and so every RAT design is tested to ensure that it can operate successfully after a lightning strike. As a result of this testing, it was found that while an air gap in a generator between the stator and the rotor needs to be small for the generator to operate efficiently, a small air gap can also allow lightning to arc between the rotor and stator and thus potentially disable the generator.

In addition, since many RAT designs include a hydraulic pump located downstream of the generator, the hydraulic pump can also be disabled by a lightning strike and an associated arc. In some cases, electrical current may damage the carbon face seal on the end of the pump to cause fluid loss.

BRIEF DESCRIPTION OF THE DISCLOSURE

According to one aspect of the disclosure, a splined muff is provided for use with a ram air turbine (RAT). The splined muff includes a body formed of plastic material having a compressive strength of about 30 ksi or higher. The body is formed to define an aperture and includes an interior facing spline for engagement with a complementary exterior facing spline; and an exterior facing spline for engagement with a complementary interior facing spline.

In accordance with additional or alternative embodiments, the plastic material includes Vespel™.

In accordance with additional or alternative embodiments, at least one or both of respective pitches and amplitudes of the interior and exterior facing splines are substantially similar.

In accordance with additional or alternative embodiments, the interior and exterior facing splines are off-phase or in-phase.

In accordance with additional or alternative embodiments, the body includes at least one of an interior flange extending radially inwardly from an axial end of the body and an exterior flange extending radially outwardly from an axial end of the body.

According to another aspect of the disclosure, a ram air turbine (RAT) assembly is provided and includes a first driveshaft having a first spline, a second driveshaft having a second spline and a splined muff formed of plastic material having a compressive strength of about 30 ksi or higher, which is interposed between the first and second driveshafts to transmit rotation from the first driveshaft to the second driveshaft. The splined muff defines an aperture and includes a third spline for engagement with the first spline and a fourth spline for engagement with the second spline.

In accordance with additional or alternative embodiments, the RAT assembly further includes at least one electrical component to which the first driveshaft is connected, a RAT and a gearbox to which the second driveshaft is connected. The gearbox is operably interposed between the RAT and the second driveshaft to transmit rotation from the RAT to the second driveshaft.

In accordance with additional or alternative embodiments, at least one electrical component includes a generator and a pump.

In accordance with additional or alternative embodiments, the gearbox includes a gear set.

In accordance with additional or alternative embodiments, the splined muff has free play and ductility sufficient to absorb driveshaft flexion and relative driveshaft movement.

In accordance with additional or alternative embodiments, a mechanical stopper impedes translational movement of the second driveshaft relative to the first driveshaft beyond a predefined point.

In accordance with additional or alternative embodiments, the plastic material includes Vespel™.

In accordance with additional or alternative embodiments, respective pitches of the third and fourth splines are substantially similar.

In accordance with additional or alternative embodiments, respective amplitudes of the third and fourth splines are substantially similar.

In accordance with additional or alternative embodiments, the third and fourth splines are off-phase.

In accordance with additional or alternative embodiments, the third and fourth splines are in-phase.

In accordance with additional or alternative embodiments, the splined muff includes a body and at least one of an interior flange extending radially inwardly from an axial end of the body and an exterior flange extending radially outwardly from an axial end of the body.

According to yet another aspect of the disclosure, a ram air turbine (RAT) assembly is provided and includes a generator driveshaft, which is connected to a generator and which has a first spline, a RAT strut driveshaft, which is connected to a gearbox of a RAT and which has a second spline and a splined muff formed of plastic material having a compressive strength of about 30 ksi or higher, which is interposed between the generator and RAT strut driveshafts to transmit RAT rotation from the gearbox and the RAT strut driveshaft to the generator driveshaft and the generator. The splined muff defines an aperture and includes a third spline for engagement with the first spline and a fourth spline for engagement with the second spline.

In accordance with additional or alternative embodiments, the first and third splines are interior facing splines with the second and fourth splines being exterior facing splines or the first and third splines are exterior facing splines with the second and fourth splines being interior facing splines.

In accordance with additional or alternative embodiments, the splined muff is disposed to prevent electrical current from arcing between the RAT strut driveshaft and the generator driveshaft.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION OF THE DISCLOSURE

As will be described below, an isolative splined muff structure is provided for disposition in a ram air turbine (RAT) assembly that is disposed for use in, for example, an aircraft. The isolative splined muff structure uses a similar number of parts as other insulating assemblies and is configured to prevent generator or pump damage due to electrical current traveling from the RAT and toward the generator from a lightning strike.

Figure 1:
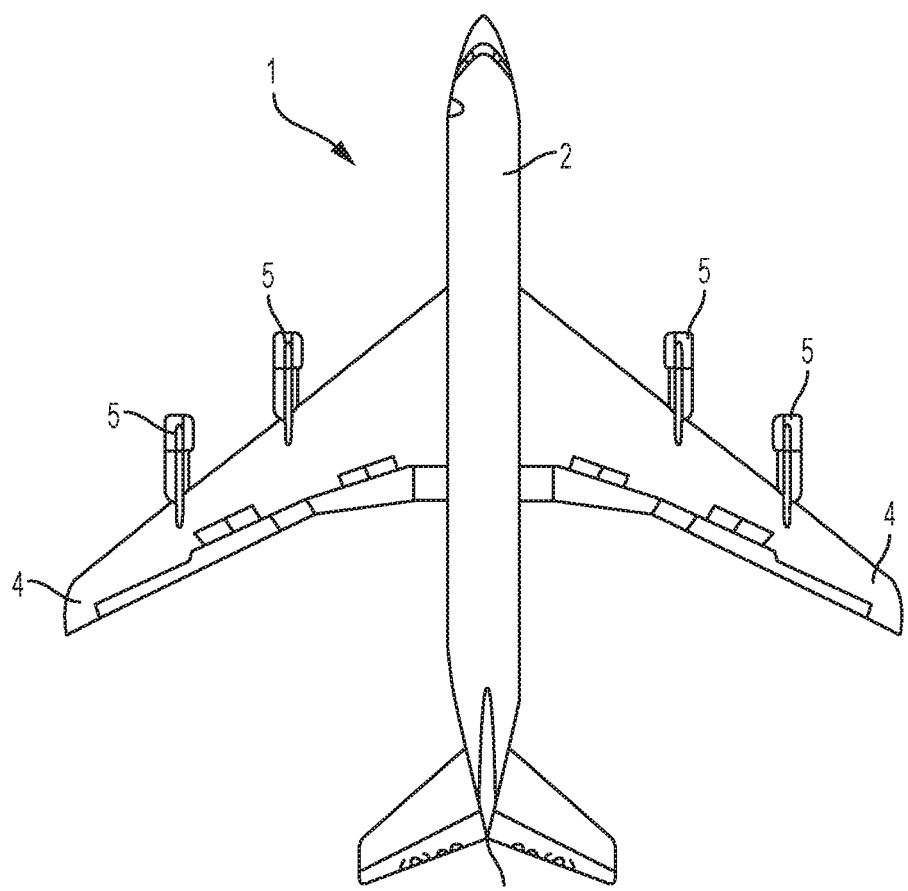
FIG. 1 is a plan view of an aircraft in accordance with embodiments.

With reference to FIG. 1, an aircraft 1 is provided and may be configured, for example, as a commercial jet although it will be understood that the aircraft 1 may have multiple alternative configurations as well. In general, the aircraft 1 includes a fuselage 2 that has a leading nose cone end and a trailing tail end, a tail assembly 3, wings 4 and engine nacelles 5. The fuselage 2 is formed to define a cockpit and a cabin along with storage areas and accommodations for a flight computer and other on-board electrical systems (e.g., air conditioning units, navigational systems, etc.). The tail assembly 3 is disposed at the trailing tail end and includes multiple aerodynamic surfaces that may be controllable, such as a rudder and stabilizer surfaces. The wings 4 extend in opposite directions from the fuselage 2 and include additional controllable surfaces, such as flaps. The engine nacelles 5 may be disposed to hang from lower sides of the wings 4 and are supportive of engines that generate power for driving flight operations.

During landing procedures, landing gear extends downwardly from the fuselage 2 to support the aircraft 1 on the ground. During emergency landing procedures, in particular, the aircraft 1 may generate at least a portion of its electrical power from a RAT assembly 10 provided to extend from either the fuselage 2 or the wings 4.

Figure 2:
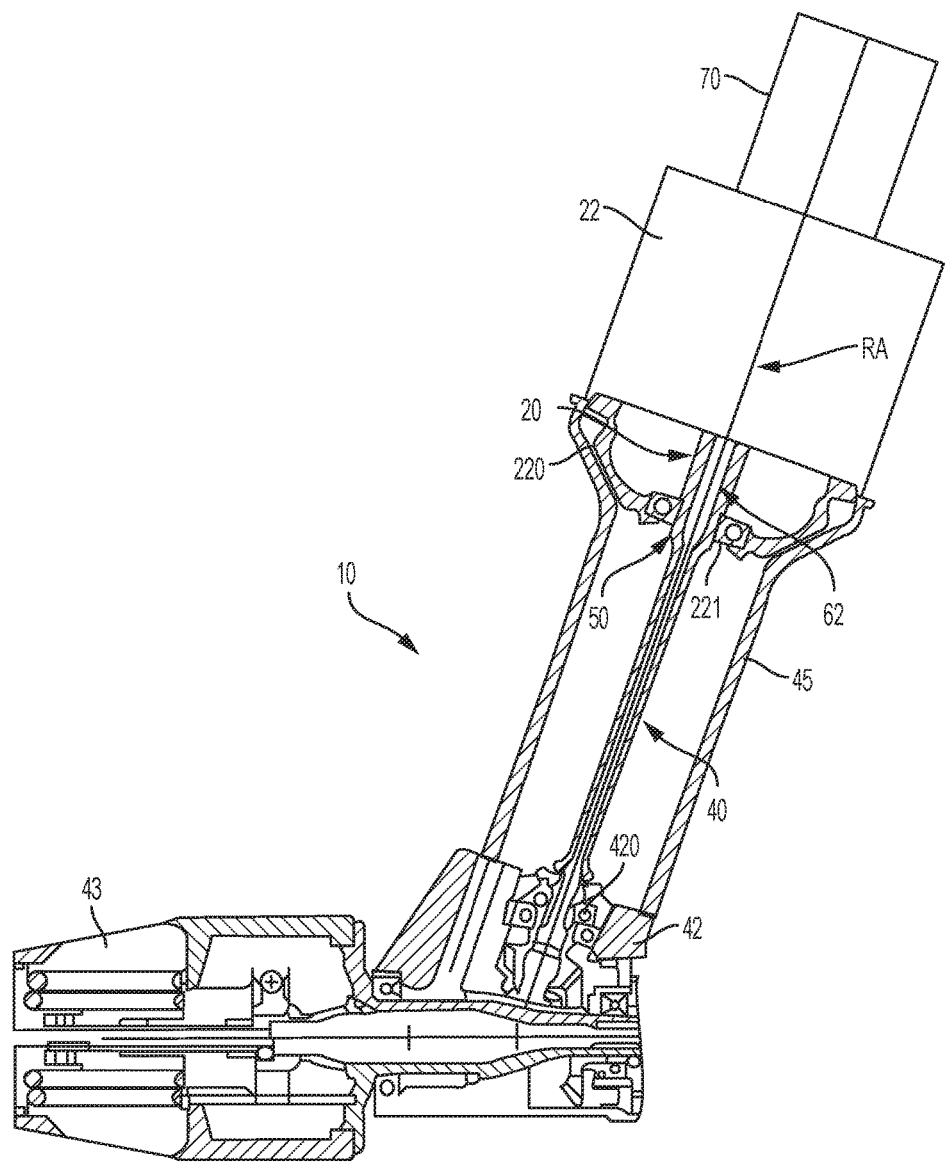
FIG. 2 is a side schematic illustration of a ram air turbine (RAT) assembly in accordance with embodiments.
Figure 3:
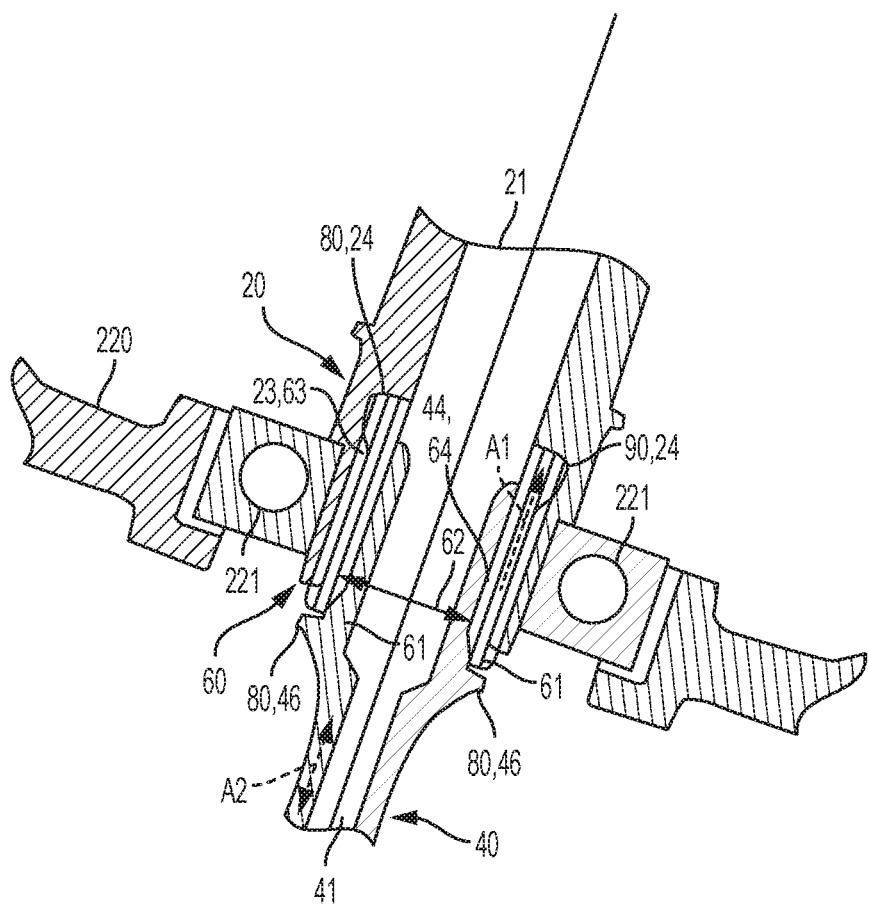
FIG. 3 is an enlarged view of a portion of FIG. 2 illustrating a splined muff of the RAT assembly.
Figure 4:
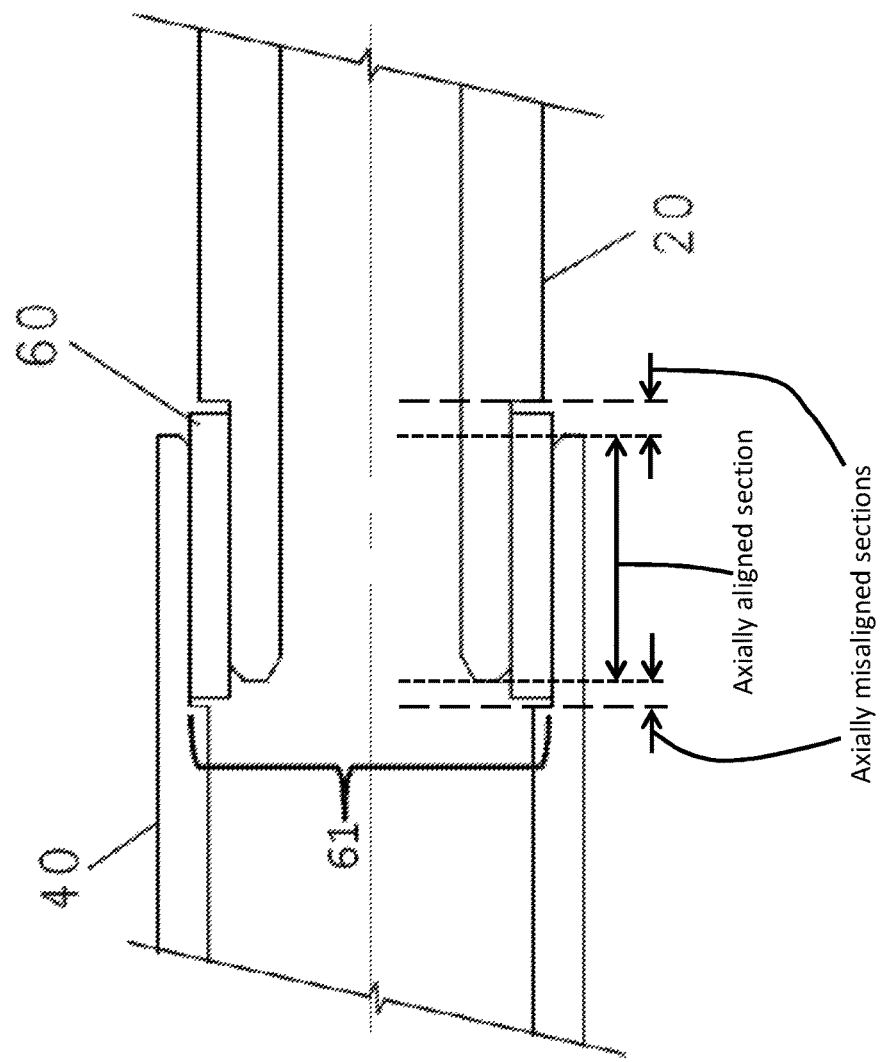
FIG. 4 is an enlarged view of a portion of FIG. 2 illustrating a splined muff of the RAT assembly in accordance with an alternative embodiment.

With reference to FIGS. 2-4, the RAT assembly 10 includes a first generator driveshaft 20, a second RAT strut driveshaft 40 and a splined muff 60. The first generator driveshaft 20 has a substantially rigid body 21 that extends along a rotational axis RA and is connected at a first end thereof to at least one electrical component, such as a generator 22. The first generator driveshaft 20 also includes a first spline 23 at a second end thereof, which is opposite the first end. The second RAT strut driveshaft 40 has a substantially rigid body 41 that extends generally along the rotational axis RA (although this is not required and may not be the case during deformative RAT operations) and is connected at a first end thereof to a gearbox 42 by which the second RAT strut driveshaft is rotationally coupled to a RAT 43. The second RAT strut driveshaft also includes a second spline 44 at a second end thereof, which is opposite the first end.

The splined muff 60 has a generally cylindrical body 61 that is formed of plastic material. The plastic material has a compressive strength of about 30 (± about 5) ksi or higher. In accordance with embodiments, the plastic material may be Vespel™ or another similar material and is in any case electrically insulating. The body 61 is interposed between the first generator driveshaft 20 and the second RAT strut driveshaft 40 to transmit rotation from the first generator driveshaft 20 to the second RAT strut driveshaft 40. The body 61 is formed to define an aperture 62 through which either the second end of the second RAT strut driveshaft 60 is extendible (see FIGS. 2 and 3) or the second end of the first generator driveshaft 20 is extendible (see FIG. 4). The body 61 includes a third spline 63, which is disposable for engagement with the first spline 23, and a fourth spline 64, which is disposable for for engagement with the second spline 44.

In accordance with embodiments, the RAT assembly 10 may further include a hydraulic pump 70, which is disposable adjacent to the generator 22. In these or other cases, the generator 22 may include a generator housing 220 that is supportive of the generator 22 and the hydraulic pump 70 as well as the first generator driveshaft 20 by way of bearing elements 221. In accordance with further embodiments, the RAT 43 may include a casing, a rotor that extends longitudinally through the casing and turbine blades that are disposed to aerodynamically interact with airflow moving through the casing and to drive rotations of the rotor accordingly. Such rotations of the rotor are then transmitted to the second RAT strut driveshaft 40 by way of the gearbox 42, which is operably interposed between the RAT 43 and the second RAT strut driveshaft 40. The gearbox 42 may include a speed increasing gear set 420 to increase a rotational speed of the second RAT strut driveshaft 40.

Although FIGS. 2 and 3 illustrate that the body 61 of the splined muff 60 is disposed radially outwardly of the second of the second RAT strut driveshaft 40 and that the second end of the first generator driveshaft 20 is disposed radially outwardly of the body 61, this configuration is not required. Indeed, as shown in FIG. 4, the opposite configuration may also be provided. Thus, the body 61 of the splined muff 60 may be disposed radially outwardly of the second of the first generator driveshaft 20 and that the second end of the second RAT strut driveshaft 40 may be disposed radially outwardly of the body 61. In either case, the body 61 is disposed to act as an insulator that prevents electrical current traveling along the second RAT strut driveshaft 40 from arcing between the second RAT strut driveshaft 40 and the first generator driveshaft 20 by maintaining a safe distance (e.g., typically about 0.06 inches or more) between the second RAT strut driveshaft 40 and the first generator driveshaft 20 or by the interposition of electrically insulating materials between the second RAT strut driveshaft 40 and the first generator driveshaft 20. This is particularly true for those cases in which the RAT assembly 10 is deployed at an exterior of the fuselage 2 or the wings 4 (see FIG. 1) with proximal thunderstorm activity during, for example, emergency or non-emergency landing operations.

Moreover, since the first generator drive shaft 20 and the second RAT strut driveshaft 40 are normally formed of stainless steel or other similar materials with a tendency to gall and would normally be in direct contact with each other, the body 61 of the splined muff 60 provides for separation between the first generator drive shaft 20 and the second RAT strut driveshaft 40. Thus, the body 61 serves to reduce wear and galling of the first generator drive shaft 20 and the second RAT strut driveshaft 40. Also, while conventional driveshaft joints need to be sealed (e.g., with an O-ring and grease), the splined muff 60 may eliminate a need for sealing and lubrication.

In addition, it is to be understood that a strut of a RAT assembly (see, e.g., the strut casing 45 surrounding the second RAT strut driveshaft 40 in FIG. 2) can deflect during RAT assembly deployment due to high aerodynamic drag loads. This deflection causes the first end of the RAT strut driveshaft 40 to move relative to the second end thereof such that the conventional splines need to be designed to tolerate significant misalignment. In accordance with the embodiments described herein, however, the body 61 of the splined muff 60 provides for an additional splined joint that allows the second spline 44 to become misaligned further than normal relative to the first spline 23. Moreover, in cases where the plastic material of the body 61 has free play and is ductile, the ability of the splined muff 60 to withstand driveshaft flexion and further misalignment of the first and second splines 23 and 44 is enhanced by the free play and absorptive splined muff 60 tooth backlash.

As shown in FIG. 3, although the body 61 of the splined muff 60 provides for additional splined joints that allow the second spline 44 to become misaligned further than normal relative to the first spline 23, the RAT assembly 10 may include a mechanical stopper 80. This mechanical stopper 80 may be disposed to impede at least translational movement of the second RAT strut driveshaft 40 relative to the first generator driveshaft 20 beyond a predefined point. In accordance with embodiments, the mechanical stopper 80 may include at least one or both of a shoulder surface 24 of the first generator driveshaft 20, which cooperates with the splined muff 60 to prevent translation in the direction identified by one-way arrow, A1, and a flange 46 of the second RAT strut driveshaft 40, which cooperates with a stop located in the gearbox 42 to prevent translations in the directions identified by the two-way arrow A2.

Figure 5:
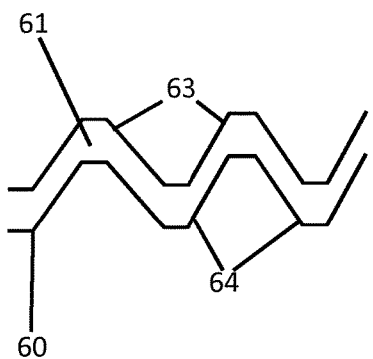
FIG. 5 is a side view of the splined muff of FIG. 3 in accordance with embodiments.
Figure 6:
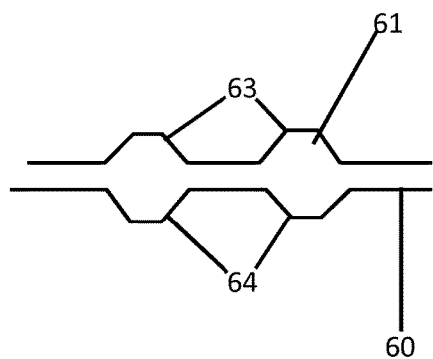
FIG. 6 is a side view of the splined muff of FIG. 3 in accordance with embodiments.
Figure 7:
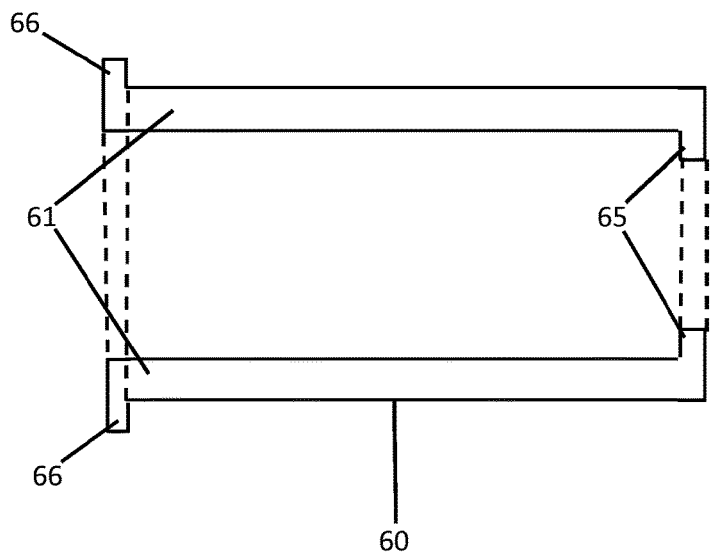
FIG. 7 is a side view of the splined muff of FIG. 3 in accordance with embodiments.

With reference to FIGS. 5-7, further embodiments of the RAT assembly 10 and the splined muff 60 will now be described. As shown in FIGS. 5 and 6, respective pitches of the third and fourth splines 63 and 64 may be substantially similar to one another (or different from one another) and respective amplitudes of the third and fourth splines 63 and 64 may be substantially similar to one another (or different from one another). Also, third and fourth splines 63 and 64 may be off-phase from one another as shown in FIG. 5 or may be in-phase with one another as shown in FIG. 6.

In addition, as shown in FIG. 7, the body 61 of the splined muff 60 may include at least one of an interior facing flange 65 and an exterior facing flange 66. The interior facing flange 65 extends radially inwardly from an axial end of the body 61 and may be disposable between a distal tip of the second RAT strut driveshaft 40 and the shoulder surface 24 of the first generator driveshaft 20. Thus, the interior facing flange 65 may serve to prevent arcing between the distal tip of the second RAT strut driveshaft 40 and the shoulder surface 24 of the first generator driveshaft 20. The exterior facing flange 66 extends radially outwardly from an axial end of the body 61 and may be disposable between the flange 46 of the second RAT strut driveshaft 40 and a distal end of the first generator driveshaft 20. Thus, the exterior facing flange 66 may serve to prevent arcing between the flange 46 of the second RAT strut driveshaft 40 and the distal tip of the first generator driveshaft 20.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements and/or components, but do not preclude the presence or addition of one or more other features, integers, steps, operations, element components and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A splined muff for a ram air turbine (RAT), the splined muff comprising:
   a body formed of plastic material having a compressive strength of about 30 ksi or higher,
   the body being formed to define an aperture and comprising:
   an interior facing spline for engagement with a complementary exterior facing spline;
   an exterior facing spline for engagement with a complementary interior facing spline;
   an interior flange extending radially inwardly from a first axial end of the body; and
   an exterior flange extending radially outwardly from a second axial end of the body, which is opposite the first axial end of the body.

2. The splined muff according to claim 1, wherein at least one or both of respective pitches and amplitudes of the interior and exterior facing splines are substantially similar.

3. The splined muff according to claim 1, wherein the interior and exterior facing splines are off-phase or in-phase.

4. A ram air turbine (RAT) assembly, comprising:
   a first driveshaft having a first spline;
   a second driveshaft having a second spline; and
   a splined muff formed of plastic material having a compressive strength of about 30 ksi or higher, which is interposed between the first and second driveshafts to transmit rotation from the first driveshaft to the second driveshaft,
   the first and second splines being disposed to be axially overlapped along an axial dimension along respective aligned sections thereof and to be axially misaligned along respective misaligned sections thereof, the respective misaligned sections being non-overlapped along the axial dimension,
   the splined muff having a length which traverses the respective aligned sections of the first and second splines and which traverses only respective portions of the respective misaligned sections thereof, and the splined muff defining an aperture and comprising a third spline for engagement with the first spline and a fourth spline for engagement with the second spline.

5. The RAT assembly according to claim 4, further comprising:
   at least one electrical component to which the first driveshaft is connected;
   a RAT; and
   a gearbox to which the second driveshaft is connected, the gearbox being operably interposed between the RAT and the second driveshaft to transmit rotation from the RAT to the second driveshaft.

6. The RAT assembly according to claim 5, wherein the at least one electrical component comprises a generator and a pump.

7. The RAT assembly according to claim 5, wherein the gearbox comprises a gear set.

8. The RAT assembly according to claim 4, wherein the splined muff has free play and ductility sufficient to absorb driveshaft flexion and relative driveshaft movement.

9. The RAT assembly according to claim 4, further comprising a mechanical stopper disposed to impede translational movement of the second driveshaft relative to the first driveshaft beyond a predefined point.

10. The RAT assembly according to claim 4, wherein respective pitches of the third and fourth splines are substantially similar.

11. The RAT assembly according to claim 4, wherein respective amplitudes of the third and fourth splines are substantially similar.

12. The RAT assembly according to claim 4, wherein the third and fourth splines are off-phase.

13. The RAT assembly according to claim 4, wherein the third and fourth splines are in-phase.

14. The RAT assembly according to claim 4, wherein the splined muff comprises:
   a body;
   an interior flange extending radially inwardly from a first axial end of the body to extend along a portion of a corresponding end of the first spline; and
   an exterior flange extending radially outwardly from a second axial end of the body, which is opposite the first axial end of the body, to extend along a portion of a corresponding end of the second spline.

15. A ram air turbine (RAT) assembly, comprising:
   a generator driveshaft, which is connected to a generator and which has a first spline;
   a RAT strut driveshaft, which is connected to a gearbox of a RAT and which has a second spline; and
   a splined muff formed of plastic material having a compressive strength of about 30 ksi or higher, which is interposed between the generator and RAT strut driveshafts to transmit RAT rotation from the gearbox and the RAT strut driveshaft to the generator driveshaft and the generator,
   the first and second splines being disposed to extend in opposite directions from the generator driveshaft and the RAT strut driveshaft, respectively, to be axially overlapped along an axial dimension along respective aligned sections thereof and to be axially misaligned along respective misaligned sections thereof, the respective misaligned sections being non-overlapped along the axial dimension,
   the splined muff having a length which traverses the respective aligned sections of the first and second splines and which traverses only respective portions of the respective misaligned sections thereof, and
   the splined muff defining an aperture and comprising a third spline for engagement with the first spline and a fourth spline for engagement with the second spline.

16. The RAT assembly according to claim 15, wherein:
   the first and third splines are interior facing splines with the second and fourth splines being exterior facing splines, or
   the first and third splines are exterior facing splines with the second and fourth splines being interior facing splines.

17. The RAT assembly according to claim 15, wherein the splined muff is disposed to prevent electrical current from arcing between the RAT strut driveshaft and the generator driveshaft and comprises:
   a body;
   an interior flange extending radially inwardly from a first axial end of the body to extend along a portion of a corresponding end of the first spline; and
   an exterior flange extending radially outwardly from a second axial end of the body, which is opposite the first axial end of the body, to extend along a portion of a corresponding end of the second spline.

* * * * *